United States Patent
Bigman (10) Patent No.: US 10,223,008 B1
(45) Date of Patent: Mar. 5, 2019

(54) STORAGE ARRAY SIZING FOR COMPRESSED APPLICATIONS

(71) Applicant: EMC IP Holding Company LLC, Hopkinton, MA (US)

(72) Inventor: Ron Bigman, Holon (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 182 days.

(21) Appl. No.: 15/281,597

(22) Filed: Sep. 30, 2016

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC ..... G06F 3/0619; G06F 3/0689; G06F 3/0665
USPC ......................................... 711/170, 171, 172
See application file for complete search history.

(56) References Cited

U.S. PATENT DOCUMENTS

| | | | |
|---|---|---|---|
| 5,204,958 A | | 4/1993 | Cheng et al. |
| 6,085,198 A | | 7/2000 | Skinner et al. |
| 6,125,399 A | | 9/2000 | Hamilton |
| 6,671,694 B2 | | 12/2003 | Baskins et al. |
| 7,035,971 B1 | * | 4/2006 | Merchant ............ G06F 11/3433 711/112 |
| 7,203,796 B1 | | 4/2007 | Muppalaneni et al. |
| 7,472,249 B2 | | 12/2008 | Cholleti et al. |
| 7,908,484 B2 | | 3/2011 | Haukka et al. |
| 8,356,060 B2 | * | 1/2013 | Marwah ............ G06F 17/30595 382/243 |
| 8,386,425 B1 | | 2/2013 | Kadayam et al. |
| 8,386,433 B1 | | 2/2013 | Kadayam |
| 8,799,705 B2 | | 8/2014 | Hallak et al. |
| 9,104,326 B2 | | 8/2015 | Frank et al. |
| 9,367,398 B1 | | 6/2016 | Ben-Moshe et al. |
| 9,442,941 B1 | | 9/2016 | Luz et al. |
| 9,703,789 B2 | | 7/2017 | Bowman et al. |
| 9,733,854 B2 | * | 8/2017 | Sharma ................. G06F 3/0626 |
| 9,886,314 B2 | * | 2/2018 | Borowiec ............ G06F 9/5016 |
| 10,116,329 B1 | * | 10/2018 | Bigman .................. H03M 7/60 |
| 2003/0061227 A1 | | 3/2003 | Baskins et al. |
| 2004/0267835 A1 | | 12/2004 | Zwilling et al. |

(Continued)

FOREIGN PATENT DOCUMENTS

| | | | | |
|---|---|---|---|---|
| JP | | 2014-206884 | 10/2014 | |
| WO | WO-2017070420 A1 | * | 4/2017 | ............. G06F 3/061 |

OTHER PUBLICATIONS

Notice of Allowance dated Sep. 22, 2017 for U.S. Appl. No. 15/079,215; 9 Pages.

(Continued)

*Primary Examiner* — Pierre Miche Bataille
(74) *Attorney, Agent, or Firm* — Daly, Crowley, Mofford & Durkee, LLP (57) ABSTRACT

A computer program product, system, and method for determining compression performance data, an expected I/O operations per second (IOPS) value, an expected data set size, and skew data for each of the logical data sets; determining resource requirements for each of the logical data sets using the corresponding skew data, compression performance data, expected data set size, and expected IOPS value; and determining, based on the resource requirements determined for each of the logical data sets, a set of resources for a storage array that can handle the workload.

18 Claims, 7 Drawing Sheets

(56) References Cited

U.S. PATENT DOCUMENTS

| | | |
|---|---|---|
| 2006/0271540 A1 | 11/2006 | Williams |
| 2007/0240125 A1 | 10/2007 | Degenhardt et al. |
| 2008/0082969 A1 | 4/2008 | Agha et al. |
| 2008/0235793 A1 | 9/2008 | Schunter et al. |
| 2009/0216953 A1 | 8/2009 | Rossi |
| 2010/0005233 A1 | 1/2010 | Hosokawa |
| 2010/0250611 A1 | 9/2010 | Krishnamurthy |
| 2011/0087854 A1 | 4/2011 | Rushworth et al. |
| 2011/0137916 A1 | 6/2011 | Deen et al. |
| 2011/0302587 A1 | 12/2011 | Nishikawa et al. |
| 2012/0023384 A1 | 1/2012 | Naradasi et al. |
| 2012/0124282 A1 | 5/2012 | Frank et al. |
| 2012/0158736 A1 | 6/2012 | Milby |
| 2012/0204077 A1 | 8/2012 | D'Abreu et al. |
| 2012/0233432 A1 | 9/2012 | Feldman et al. |
| 2013/0036289 A1 | 2/2013 | Welnicki et al. |
| 2013/0212074 A1 | 8/2013 | Romanski et al. |
| 2013/0290285 A1 | 10/2013 | Gopal et al. |
| 2013/0318053 A1 | 11/2013 | Provenzano et al. |
| 2013/0326318 A1 | 12/2013 | Haswell |
| 2013/0346716 A1 | 12/2013 | Resch |
| 2014/0019764 A1 | 1/2014 | Gopal et al. |
| 2014/0032992 A1 | 1/2014 | Hara et al. |
| 2014/0122823 A1 | 5/2014 | Gupta et al. |
| 2014/0244598 A1 | 8/2014 | Haustein et al. |
| 2015/0019507 A1 | 1/2015 | Aronovich |
| 2015/0098563 A1 | 4/2015 | Gulley et al. |
| 2015/0149789 A1 | 5/2015 | Seo et al. |
| 2015/0186215 A1 | 7/2015 | Das Sharma et al. |
| 2015/0199244 A1 | 7/2015 | Venkatachalam et al. |
| 2015/0205663 A1 | 7/2015 | Sundaram et al. |
| 2015/0263986 A1* | 9/2015 | Park ............... H04L 47/781 709/226 |
| 2016/0011941 A1 | 1/2016 | He et al. |
| 2016/0110252 A1 | 4/2016 | Hyun et al. |
| 2016/0132270 A1 | 5/2016 | Miki |
| 2017/0115878 A1* | 4/2017 | Dewaikar ............. G06F 3/061 |
| 2017/0123995 A1 | 5/2017 | Freyensee et al. |
| 2017/0255515 A1 | 9/2017 | Kim et al. |

OTHER PUBLICATIONS

Response (w/RCE) to U.S. Final Office Action dated Jun. 20, 2017 for U.S. Appl. No. 14/228,971; Response filed Sep. 13, 2017; 14 Pages.
U.S. Appl. No. 14/228,971, filed Mar. 28, 2014, Shoikhet et al.
U.S. Appl. No. 14/979,890, filed Dec. 28, 2015, Meiri et al.
U.S. Appl. No. 15/079,205, filed Mar. 24, 2016, Dorfman et al.
U.S. Appl. No. 15/079,208, filed Mar. 24, 2016, Ben-Moshe et al.
U.S. Appl. No. 15/079,213, filed Mar. 24, 2016, Ben-Moshe et al.
U.S. Appl. No. 15/079,215, filed Mar. 25, 2016, Krakov et al.
U.S. Appl. No. 15/282,546, filed Sep. 30, 2016, Kucherov et al.
U.S. Appl. No. 15/281,593, filed Sep. 30, 2016, Braunschvig et al.
U.S. Appl. No. 14/976,532, filed Dec. 21, 2015, Bigman.
U.S. Appl. No. 15/086,565, filed Mar. 31, 2016, Bigman.
U.S. Office Action dated Aug. 27, 2015 corresponding to U.S. Appl. No. 14/228,971; 23 Pages.
Response to U.S. Office Action dated Aug. 27, 2015 corresponding to U.S. Appl. No. 14/228,971; Response filed on Jan. 14, 2016; 10 Pages.
U.S. Final Office Action dated Feb. 25, 2016 corresponding to U.S. Appl. No. 14/228,971; 27 Pages.
Request for Continued Examination (RCE) and Response to Final Office Action dated Feb. 25, 2016 corresponding to U.S. Appl. No. 14/228,971; Response filed on May 25, 2016; 12 Pages.
U.S. Office Action dated Jun. 10, 2016 corresponding to U.S. Appl. No. 14/228,971; 27 Pages.
Response to U.S. Office Action dated Jun. 10, 2016 corresponding to U.S. Appl. No. 14/228,971; Response filed Aug. 17, 2016; 10 Pages.
U.S. Final Office Action dated Oct. 4, 2016 corresponding to U.S. Appl. No. 14/228,971; 37 Pages.
U.S. Office Action dated Sep. 22, 2015 corresponding to U.S. Appl. No. 14/228,982; 17 Pages.
Response to U.S. Office Action dated Sep. 22, 2015 corresponding to U.S. Appl. No. 14/228,982; Response filed on Feb. 1, 2016; 10 Pages.
Notice of Allowance dated Apr. 26, 2016 corresponding to U.S. Appl. No. 14/228,982; 9 Pages.
U.S. Office Action dated Jan. 12, 2016 corresponding to U.S. Appl. No. 14/228,491; 12 Pages.
Response to Office Action dated Jan. 12, 2016 corresponding to U.S. Appl. No. 14/229,491; Response filed on Jun. 2, 2016; 7 Pages.
Notice of Allowance dated Jul. 25, 2016 corresponding to U.S. Appl. No. 14/229,491; 10 Pages.
EMC Corporation, "Introduction to the EMC XtremIO Storage Array;" Version 4.0; White Paper—A Detailed Review; Apr. 2015; 65 Pages.
Vijay Swami, "XtremIO Hardware/Software Overview & Architecture Deepdive;" EMC On-Line Blog; Nov. 13, 2013; Retrieved from <http://vjswami.com/2013/11/13/xtremio-hardwaresoftware-overview-architecture-deepdive/>; 18 Pages.
Jon Klaus "EMC World—Day 4—VNX: Skew & Data Placement;" FastStorage, High Octane IT; Blog posted May 16, 2013; http://faststorage.eu/emc-world-day-4-vnx-skew-data-placement/; 5 Pages.
Response to U.S. Non-Final Office Action dated Oct. 4, 2017 corresponding to U.S. Appl. No. 14/228,971; Response filed Jan. 26, 2018; 11 Pages.
U.S. Non-Final Office Action dated Nov. 13, 2017 for U.S. Appl. No. 15/079,213, 9 pages.
U.S. Non-Final Office Action dated Feb. 9, 2017 for U.S. Appl. No. 14/228,971; 38 Pages.
U.S. Non-Final Office Action dated Dec. 1, 2017 for U.S. Appl. No. 14/979,890; 10 Pages.
U.S. Non-Final Office Action dated Apr. 21, 2017 for U.S. Appl. No. 15/079,215; 53 Pages.
Request for Continued Examination (RCE) and Response to Final Office Action dated Oct. 4, 2016 corresponding to U.S. Appl. No. 14/228,971; RCE and Response filed on Jan. 4, 2017; 19 Pages.
Response to U.S. Non-Final Office Action dated Dec. 1, 2017 for U.S. Appl. No. 14/979,890; Response filed on Feb. 28, 2018; 9 Pages.
Response to U.S. Non-Final Office Action dated Nov. 28, 2017 for U.S. Appl. No. 15/079,205; Response filed on Feb. 28, 2018; 11 Pages.
Response to U.S. Non-Final Office Action dated Nov. 13, 2017 for U.S. Appl. No. 15/079,213; Response filed on Feb. 13, 2018; 9 Pages.
Response to U.S. Non-Final Office Action dated Feb. 9, 2017 for U.S. Appl. No. 14/228,971; Response filed on May 9, 2017; 12 Pages.
Response to U.S. Non-Final Office Action dated Apr. 21, 2017 for U.S. Appl. No. 15/079,215; Response filed on Jul. 21, 2017; 9 Pages.
U.S. Final Office Action dated Jun. 20, 2017 for U.S. Appl. No. 14/228,971; 40 Pages.
U.S. Final Office Action dated May 29, 2018 for U.S. Appl. No. 14/228,971; 35 pages.
U.S. Non-Final Office Action dated May 31, 2018 for U.S. Appl. No. 15/281,593; 10 pages.
Response to Office Action dated Jun. 2, 2017 from U.S. Appl. No. 15/079,208, filed Sep. 5, 2017; 10 Pages.
Response to U.S. Non-Final Office Action dated Dec. 29, 2017 for U.S. Appl. No. 15/079,208; Response filed on Apr. 30, 2018; 7 Pages.
Response to U.S. Non-Final Office Action dated Dec. 22, 2017 for U.S. Appl. No. 15/282,546; Response filed May 17, 2018; 8 Pages.
U.S. Non-Final Office Action dated Nov. 28, 2017 corresponding to U.S. Appl. No. 15/079,205; 9 Pages.
U.S. Non-Final Office Action dated Dec. 29, 2017 corresponding to U.S. Appl. No. 15/079,208; 10 Pages.
U.S. Non-Final Office Action dated Dec. 22, 2017 corresponding to U.S. Appl. No. 15/282,546; 12 Pages.
U.S. Non-Final Office Action dated Oct. 4, 2017 for U.S. Appl. No. 14/228,971; 37 pages.

(56) References Cited

OTHER PUBLICATIONS

U.S. Non-Final Office Action dated Jun. 2, 2017 for U.S. Appl. No. 15/079,208; 19 Pages.
Notice of Allowance dated Sep. 10, 2018 for U.S. Appl. No. 15/281,593; 9 Pages.
Response to U.S. Non-Final Office Action dated May 31, 2018 for U.S. Appl. No. 15/281,593; Response filed on Jul. 2, 2018; 13 pages.

* cited by examiner

STORAGE ARRAY SIZING FOR COMPRESSED APPLICATIONS

BACKGROUND

There are many classes of storage devices. For example, there are solid-state disks (SSDs) and hard disk drives (HDDs). HDDs may be further classified as Serial Attached SCSI (SAS), Near Line SAS (NL-SAS), and Serial ATA (SATA). SSDs may be more expensive but provide faster read/write times compared to HDDs. SAS and NL-SAS may be more expensive but provide faster data retrieval compared to SATA disks. Compression can be used to reduce the amount of data stored on a given class of storage. Within a given data set or workload, some data may be stored compressed, while other data may be stored uncompressed. Some systems support multiple different compression algorithms and provide processes to choose among the different algorithms, and to allow data compressed with different algorithms to coexist.

SUMMARY

In accordance with one aspect of the disclosure, a method comprises: determining compression performance data, an expected I/O operations per second (IOPS) value, an expected data set size, and skew data for each of the logical data sets; determining resource requirements for each of the logical data sets using the corresponding skew data, compression performance data, expected data set size, and expected IOPS value; and determining, based on the resource requirements determined for each of the logical data sets, a set of resources for a storage array that can handle the workload.

In various embodiments, the method further comprises collecting I/O statistics for each of the logical data sets, wherein determining an expected I/O operations per second (IOPS) value, an expected data set size, and skew data for a logical data set comprises determining an expected I/O operations per second (IOPS) value, an expected data set size, and skew data for the logical data set using the corresponding collecting I/O statistics. In another embodiment, the method further comprises determining an application type associated with one or more of the logical data sets, wherein determining compression performance data and skew data for each of the one or more logical data sets comprises retrieving historic compression performance data and skew data for each of the one or more logical data sets.

In some embodiments, determining a set of resources for a storage array that can handle the workload comprising determining a number of processors, a number of storage devices, and an amount of memory that can handle the workload. In one embodiment, determining resource requirements for a logical data set comprises: selecting first and second compression algorithms from a set of available compression algorithms; selecting a data partition value X, where 0≤X≤100; determining storage requirements for the logical data set using the corresponding compression performance data and expected data set size, where the storage requirements are based on compressing X % of data using the first compression algorithm and the remaining data using the second compression algorithm; and determining processing requirements for the logical data set using the corresponding compression performance data, expected IOPS value, and skew data, wherein the processing requirements are based compressing the most active X % of data using the first compression algorithm and compressing the remaining data using the second compression algorithm.

In another embodiment, the steps of determining storage requirements and determining processing requirements are repeated for different first and second compression algorithms and different data partition values, wherein the resource requirements determined include the least expensive storage requirements least expensive storage requirements and processing requirements determined.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. In certain embodiments, as may be used herein, the term "storage system" may be broadly construed so as to encompass, for example, private or public cloud computing systems for storing data as well as systems for storing data comprising virtual infrastructure and those not comprising virtual infrastructure. In some embodiments, as may be used herein, the terms "client," "customer," and "user" may refer to any person, system, or other entity that uses a storage system to read/write data.

In many embodiments, as may be used herein, the term "storage device" may refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). In certain embodiments, the term "storage array" may be used herein to refer to any collection of storage devices. In some embodiments herein, for simplicity of explanation, the term "disk" may be used synonymously with "storage device."

In certain embodiments, the term "I/O request" or simply "I/O" may be used to refer to an input or output request. In some embodiments, an I/O request may refer to a data read or write request.

Figure 1:
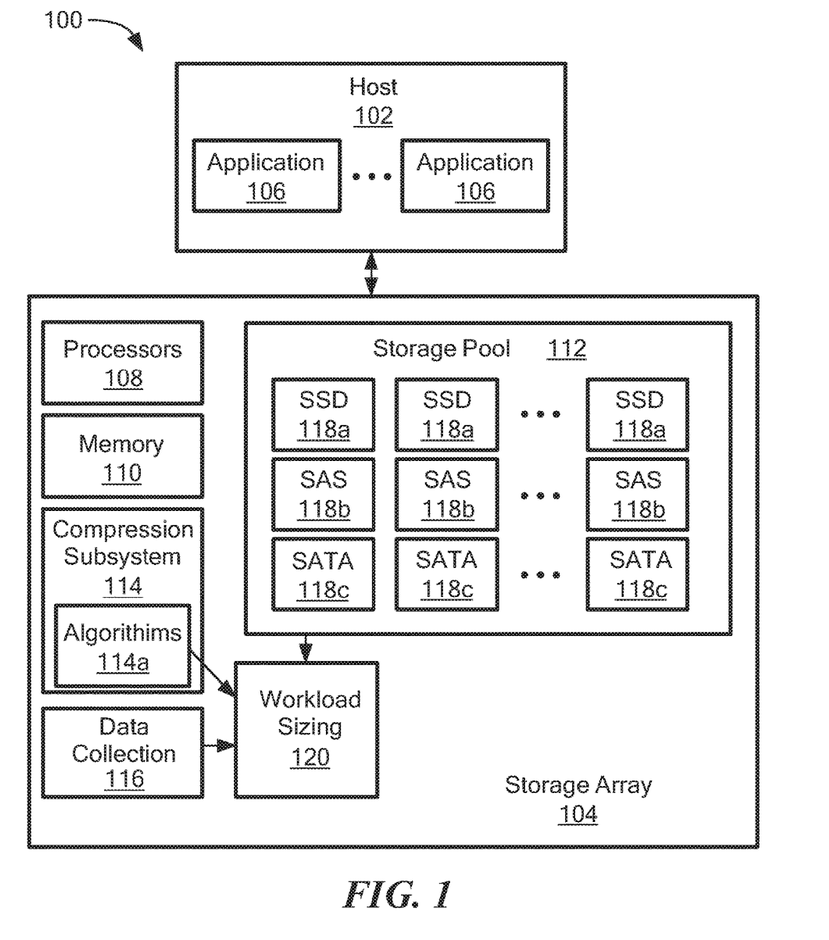
FIG. 1 is a block diagram of a storage system, according to an embodiment of the disclosure.

FIG. 1 shows a storage system 100, according to an embodiment. The system 100 includes a host 102 and a storage array 104. The storage array 104 includes processors 108, memory 110, a storage pool 112, a compression subsystem 114, a data collection subsystem 116, and a workload sizing subsystem 120. The storage pool 112 includes a plurality of storage devices (generally denoted 118). In some embodiments, the storage pool includes different classes (or "tiers") of storage devices. In the embodiment of FIG. 1, the storage pool 112 includes SSDs 118a, SAS disks 118b, and SATA disks 118c. In certain embodiments, the memory 100 is provided as volatile random access memory.

In the embodiment of FIG. 1, the host 102 includes one or more applications 106 that read data from, and write data to, one or more provisioned storage devices 118 within the storage array 104. An application 106 may be associated with a so-called "logical data set," which corresponds to the set of data used by that application during operation. For example, in the case of a database server, a logical data set may correspond to an entire database. As another example, a user application may have a logical data set that corresponds to an individual schema within a database. As yet another example, a logical data set may correspond to a file system or a set of files stored therein. The storage array 104 may handle many logical data sets, which are collectively referred to herein as its "workload."

The compression subsystem 114 can compress data in the storage pool 112 using one or more compression algorithms 114a. Compression algorithms 114a may include one or more compression algorithms—such as Lempel-Ziv (LZ), DEFLATE, and Lempel-Ziv-Renau (LZR)—along with different configurations of each such algorithm. For example, the same LZ compression algorithm using two different block sizes is considered as two different compression algorithms herein.

The data collection subsystem 116 collects information about one or more logical data sets within the storage array 104. In some embodiments, the data collection subsystem observes I/Os sent from the host to the storage array and collects I/O statistics, such as average an expected I/O operations per second (IOPS) across all extents, average IOPS per extent, average read/write latency, and/or the average data size for reads and writes. In one embodiment, the data collection subsystem collects information about logical data sets by analyzing data stored within the storage pool. In certain embodiments, the data collection subsystem collects information on a per-logical data set basis. Referring to the embodiment of FIG. 1, using the collected data, the data collection subsystem 116 can derive information used to size a workload to a storage array. In some embodiments, the data collection subsystem may derive an expected IOPS for each logical data set, an expected data set size for each logical data set, and/or skew data for each logical data set (skew is a concept described below in conjunction with FIG. 2).

In many embodiments, the data collection subsystem collects data that describes the performance of each of the available compression algorithms (e.g., each of the available compression algorithms 114a) on each logical data set. Such data is referred to herein as "compression performance data." In some embodiments, per-logical data set compression performance data includes: (1) the compression ratio achieved by each of the compression algorithms on the data set; (2) average latency added by each of the compression algorithms per I/O on the data set; (3) average processor cycles added by a compression algorithm per I/O on the data set; and/or (4) average memory used by each of the compression algorithms per I/O on the data set. In certain embodiments, the term "compression ratio" may refer to the ratio between uncompressed data size and compressed data size (i.e., the size of the data after the compression algorithm is applied).

In some embodiments, compression performance data may be collected for an existing workload by analyzing compressed data stored within a storage pool. In other embodiments, compression performance data may be collected for a new workload by collecting data samples from the workload, compressing data samples using one or more different compression algorithms, and analyzing the compression performance of the compressed samples.

Referring to FIG. 1, the workload sizing subsystem 120 can size a storage array for a workload. In some embodiments, the workload sizing subsystem determines a set of resources (e.g., processors, memory, and storage devices) needed to handle the workload. In various embodiments, the workload sizing subsystem performs at least some of the processing described below in conjunction with FIGS. 3 and 3A.

In the embodiment of FIG. 1, the workload sizing subsystem 120 is provided within an existing storage system 100 and, thus, can be used to size a new storage array for a workload running on existing storage system 100. In certain embodiments, the workload sizing subsystem may size the new storage array while optimizing for cost. In other embodiments, the functionality of the workload sizing subsystem may be provided in a standalone tool that can be used without requiring an existing storage array, as described further below in conjunction with FIG. 4.

In certain embodiments, the storage array is a flash storage array. In some embodiments, the storage system may include one or more of the features described in U.S. Pat. No. 9,104,326, issued Aug. 11, 2015, entitled "SCALABLE BLOCK DATA STORAGE USING CONTENT ADDRESSING," which is assigned to the same assignee as this patent application and is incorporated herein in its entirety. In certain embodiments, the storage system may include an EMC® XTREMIO® system.

Figure 2:
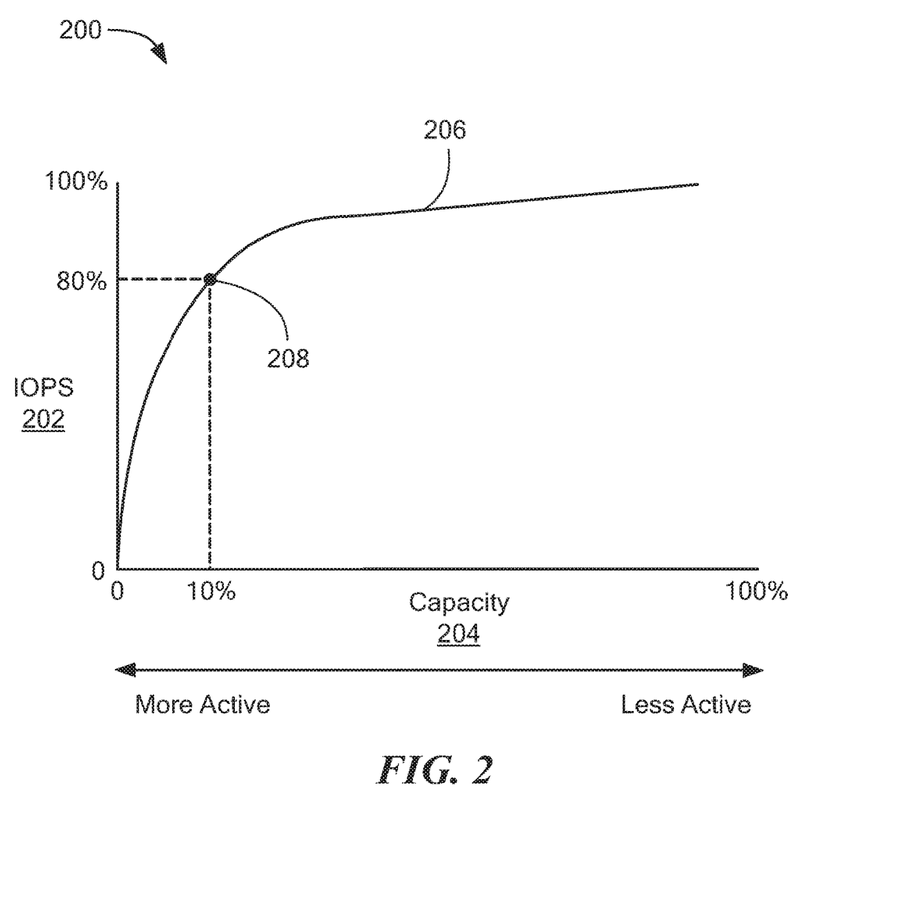
FIG. 2 is an example of a graph that can be used to represent skew for a logical data set, according to an embodiment of the disclosure.

Referring to FIG. 2, a graph 200 can be used to represent skew for a logical data set, according to some embodiments. The data underlying the graph 200 is referred to herein as "skew data." The logical data set includes a plurality of extents (e.g., blocks, chunks, objects, fragments, etc.). Each extent has a data size and an activity value, which can be measured as I/Os per second (IOPS). The extents may be ordered from most active to least active, and the cumulative data size and IOPS can be plotted as curve 206. In the embodiment of FIG. 2, the horizontal axis 204 corresponds to the cumulative data size, expressed as a percentage of total capacity required by the logical data set, and the vertical axis 202 corresponds to the cumulative IOPS, expressed as a percentage of total IOPS for the logical data set. The relationship between active extent capacity and IOPS illustrated by curve 206 is referred to herein as "skew."

The skew curve 206 can be used to determine which percentage of capacity generates a given percentage of total activity. A given point along the curve 206 can be used to partition a logical data set into two tiers: a most active data tier and a least active data tier. For example, in the embodiment of FIG. 2, the point 208 on the curve 206 indicates that the most active 10% of data is responsible for 80% of activity, and the remaining data (i.e., the least active 90% of data) is responsible for 20% of activity. In some embodiments, a capacity value (e.g., 10%) is referred to herein as the "data partition value."

In various embodiments, a data collection subsystem (e.g., subsystem 116 in FIG. 1) can determine skew for a given logical data set by observing I/Os sent from a host to the storage array. In many embodiments, skew can be used to size a storage array, as described below.

Figure 3:
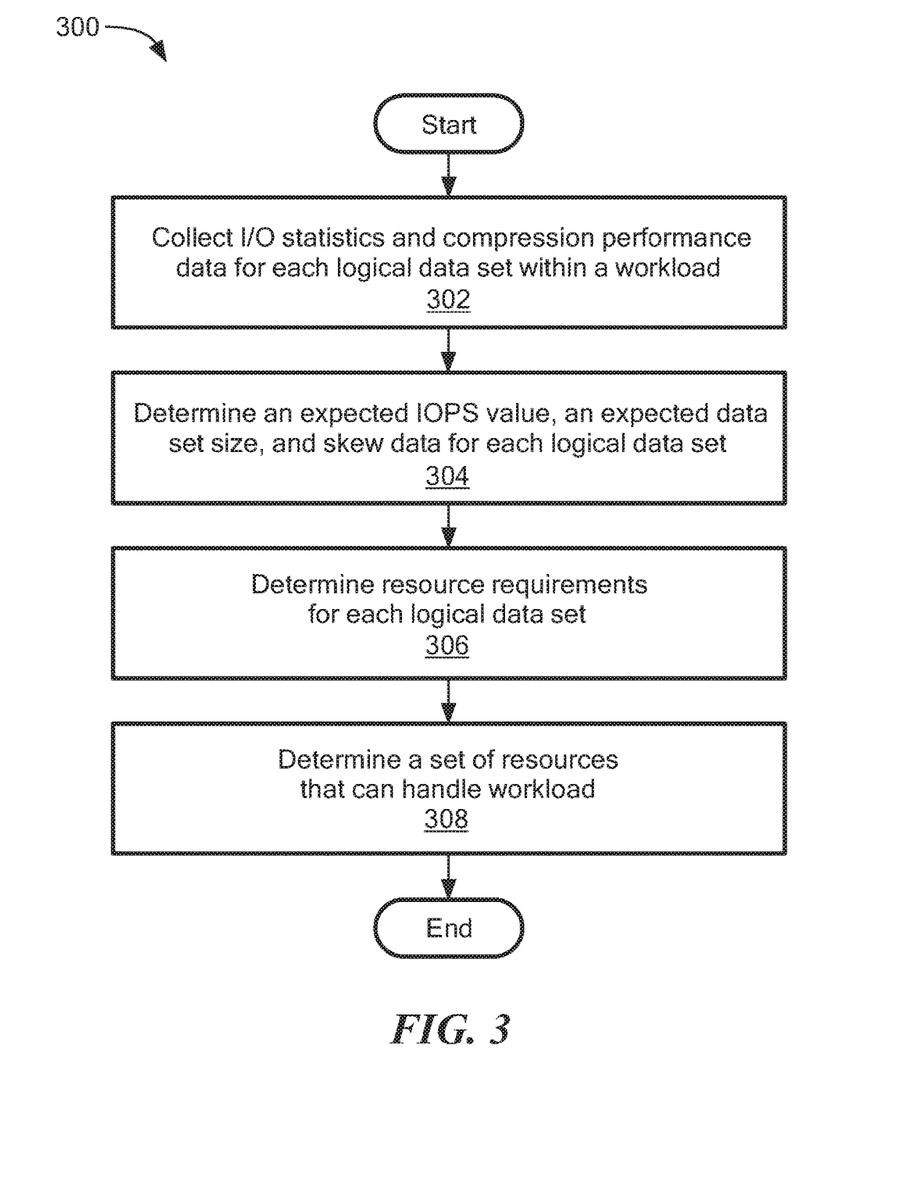
FIGS. 3 and 3A are flow diagrams illustrating processing that may occur within a storage system, according to some embodiments of the disclosure.
Figure 3A:
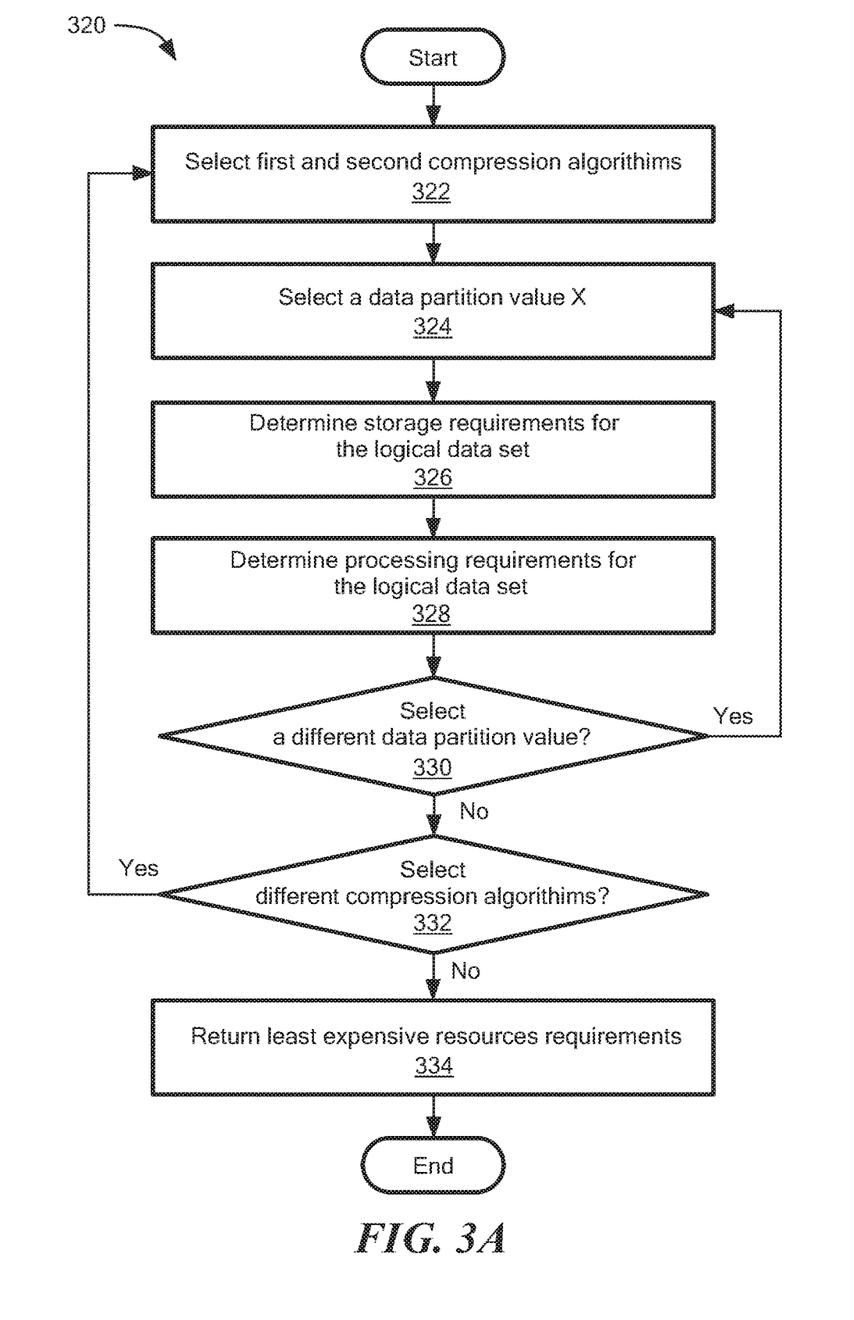
Figure 5:
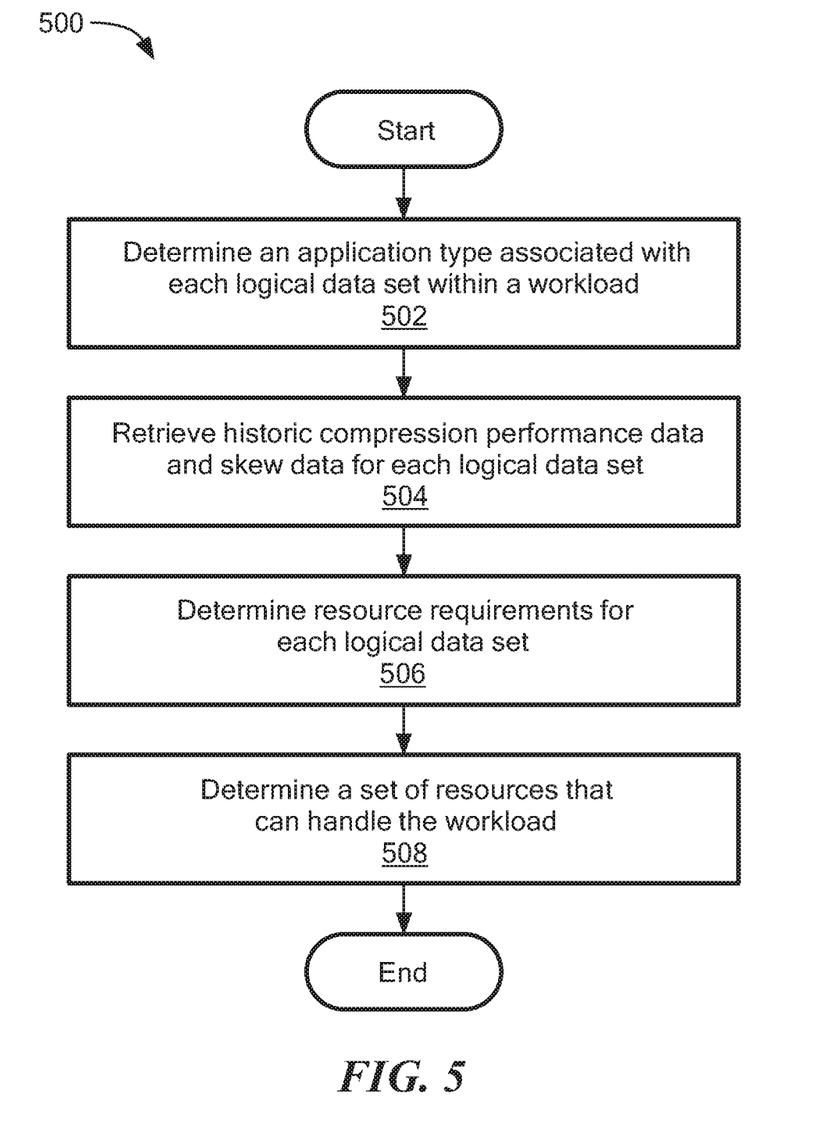
FIG. 5 is a flow diagram illustrating additional processing that may occur within a storage system, according to an embodiment of the disclosure.

FIGS. 3, 3A, and 5 are flow diagrams showing illustrative processing, according to several embodiments of the disclosure. Rectangular elements (typified by element 302 in FIG. 3), herein denoted "processing blocks," represent computer software instructions or groups of instructions. Diamond shaped elements (typified by element 330 in FIG. 3A), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables, may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to FIG. 3, a method 300 sizes a storage array for a workload, wherein the storage array supports multiple compression algorithms, according to an embodiment. In certain embodiments, a storage system (e.g., storage system 100 of FIG. 1) implements at least a portion of the method. In one embodiment, a workload sizing subsystem (e.g., workload sizing subsystem 120 of FIG. 1) implements at least a portion of the method.

Referring again to FIG. 3, the method 300 begins at block 302, where I/O statistics and compression performance data are collected for each logical data set within a workload. In some embodiments, the I/O statistics include average IOPS (for all extents), average IOPS per extent, average read/write latency, and/or the average data size for reads and writes. In various embodiments, compression performance data for a given logical data set includes performance data for each of a plurality of compression algorithms as applied to that logical data set. In certain embodiments, compression performance data for a given logical data set may include: the compression ratio achieved by each of the compression algorithms, average latency added by each of the compression algorithms per I/O, average processor cycles added by each of the compression algorithms per I/O, and/or average memory used by each of the compression algorithms per I/O.

Referring to FIG. 3, at block 304, an expected IOPS value, an expected data set size, and skew data are determined for each of the logical data sets. In certain embodiments, expected IOPS values, expected data set sizes, and/or skew data may be determined using the corresponding collected I/O statistics. In some embodiments, the expected IOPS value may be equal to the average IOPS value within the collected I/O statistics. In certain embodiments, the expected data set size may be provided as input by a user. In some embodiments, the expected data set size may be estimated based data set sizes in similar workloads. In various embodiments, the skew data is derived from the average IOPS per extent within the collected I/O statistics.

Referring again to FIG. 3, at block 306, resource requirements are determined for each logical data set. In some embodiments, the resource requirements may be determined using the corresponding skew data, compression performance data, expected data set sizes, and expected IOPS values. In many embodiments, the resource requirements may be resources needed to store the logical data set and to process I/Os for the logical data set (i.e., the resources needed to "handle" the logical data set), whereby the data can be compressed using multiple different compression algorithms. In some embodiments, the resource requirements may be the least expensive resources needed to handle the logical data set. In some embodiments, resource requirements for a logical data set include an expected number of processor cycles needed to process I/Os for the logical data set (including any added processor cycles due to compression), an expected storage capacity needed to store the logical data set, and/or an expected memory capacity needed (including any added memory due to compression). In various embodiments, determining resource requirements for a logical data set may include performing at least some of the processing described below in conjunction with FIG. 3A.

Referring again to FIG. 3, at block 308, a set of resources that can handle the workload are determined. In various embodiments, the set of resources may be determined based on the resource requirements determined for each of the logical data sets In some embodiments, the set of resources may be the least expensive set of resources needed to handle the workload. In certain embodiments, the set of resources may include a number of storage devices, a number of processors (e.g., CPUs), and/or an amount of memory (e.g., RAM). In one embodiment, the set of resources may include the minimal number of disks, number of processors, and/or amount of memory needed to handle the workload.

Referring to FIG. 3A, a method 320 sizes a storage array for a logical data set, wherein the storage array supports multiple compression algorithms, according to an embodiment. In some embodiments, the method may determine the least expensive resources needed to handle the logical data set. In some embodiments, the logical set may be stored using two different compression algorithms, where not compressing data is considered a compression algorithm. In one embodiment, a workload sizing subsystem (e.g., workload sizing subsystem 120 of FIG. 1) may implement at least a portion of the method. In another embodiment, a standalone workload sizing tool (e.g., workload sizing tool 400 of FIG. 4) may implement at least a portion of the method.

Referring again to FIG. 3A, at block 322, first and second compression algorithms are selected. In some embodiments, the first and second compression algorithms may be selected from a set of available compression algorithms (e.g., available compression algorithms 114a in FIG. 1). In one embodiment, assuming the set of available compression algorithms A, B, and C, along with the special case of no compression; TABLE 1 shows a combination of first and second compression algorithms that may be selected. In some embodiments, the method may iterate over multiple combinations of compression algorithms, as described further below. In certain embodiments, the method may select combinations of compression algorithms in order based on algorithm performance data for the logical data set (e.g., the method may select an algorithm having a lower compression ratio before selecting an algorithm having a higher compression ratio). In various embodiments, the first compression algorithm may be selected to have a lower compression ratio compared to the second compression algorithm.

TABLE 1

| First Compression Algorithm | Second Compression Algorithm |
|---|---|
| No compression | A |
| No compression | B |
| No compression | C |
| A | B |
| A | C |
| B | C |

Referring again to FIG. 3A, at block 324, a data partition value X is selected, where 0≤X≤100. As described further below, the resources required to handle the logical data set depends on which data (and how much data) is compressed using the first algorithm and which data is compressed using the second algorithm. The selected data partition value X controls which data is compressed by the first algorithm versus the second algorithm. In some embodiments, the method may evaluate multiple data partition values for each combination of compression algorithms. In certain embodiments, the method may iterate over data partition values in a stepwise manner (e.g., X=0, 1, 2, . . . , 100).

Referring again to FIG. 3A, at block 326, storage requirements are determined for the logical data set. In various embodiments, the storage requirements may be determined using the corresponding compression performance data and an expected data set size. In some embodiments, the storage requirements may be based on compressing X % of the data within the logical data set using the first compression algorithm, and compressing the remaining (100−X) % of the data using the second compression algorithm.

In some embodiments, the compression performance data and/or expected data set size may be determined by collecting I/O statistics from an existing workload as described above in conjunction with FIG. 3. In other embodiments, the compression performance data and/or expected data set size may be determined using historical data for similar applications, as described below in conjunction with FIG. 5.

In one embodiment, the storage requirements may be determined using the following equation:

((max_expected_data_set_size*(X/100))/first_compression_factor)+((max_expected_data_set_size*((100−X)/100))/second_compression_factor), where first_compression_factor is a value for the compression ratio of the first algorithm as applied to the logical data set (according to the compression performance data) and second_compression_factor is a value for the compression ratio of the second algorithm. In one embodiment, considering the compression performance data shown in TABLE 2 and assuming that the first compression algorithm is selected to be "No compression," the second compression algorithm may be selected to be algorithm B, and the data partition value is selected to be X=1. In such an embodiment, 1% of the data would not be compressed and 99% of the data would be compressed at a ratio of 1:2. In the aforementioned embodiment, further assuming that the expected size for the logical data set is 200TB, some embodiments storage requirements may be calculated as ((200TB*(1/100))/1)+((200TB*((100−1)/100))/2), or 101TB. In some embodiments, the storage requirements may be used to determine the number of storage devices needed to handle the logical data set.

TABLE 2

| Compression algorithm | Compression ratio | Avg. extra processor cycles per I/O |
|---|---|---|
| No compression | 1:1 | 0 |
| A | 1:1.5 | 100 |
| B | 1:2 | 200 |
| C | 1:3 | 400 |

Referring again to FIG. 3A, at block 328, processing requirements are determined for the logical data set. In many embodiments, the processing requirements may be using corresponding compression performance data, an expected IOPS value, and skew data. In certain embodiments, the processing requirements may be based compressing the most active X % of data within the logical data set using the first compression algorithm and compressing the remaining data using the second compression algorithm.

In some embodiments, the compression performance data, expected IOPS value, and/or skew data may be determined by collecting I/O statistics from an existing workload as described above in conjunction with FIG. 3. In other embodiments, the skew data may be determined using historical data for similar applications, as described below in conjunction with FIG. 5.

In one embodiment, the processing requirements may be determined using the following equation:

(expected_iops*(most_active_iop_percentage/100)
*first_extra_cycles_per_io)+(expected_iops*((1−
most_active_iop_percentage)/100)*second_extra_cycles_per_io), where most_active_iop_percentage is the percentage of activity for which the most active X % of data is responsible for (according to the skew data), first_extra_cycles_per_io is average number of cycles per I/O due to the first compression algorithm (according to the compression performance data), and second_extra_cycles_per_io is average number of cycles per I/O due to the second compression algorithm. In one embodiment, considering again the compression performance data shown in TABLE 2 and assuming that the first compression algorithm is selected to be "No compression," the second compression algorithm may be selected to be algorithm B, and the data partition value may be selected to be X=1. In the aforementioned embodiment, further assuming that the expected IOPS value is 50 and, according to the skew data, the most active 1% of data is responsible for 30% of activity, the processing requirements may be calculated as (50 IO/s*(30%/100)*0)+(50 IOPS*(70%/100)*200 cycles/IO) or 7000 cycles/s.

In some embodiments, the processing requirements may include only processing cycles that are due to compression. In other embodiments, cycles due to other parts of I/O processing may be included within the processing requirements calculation for a given logical data set.

In various embodiments, the storage requirements may be used to determine a number of storage devices needed to handle the logical data set. In some embodiments, the processing requirements may be used to determine a number of processors needed to handle the logical data set.

In one embodiment, the method also includes determining memory requirements for the logical data set based on memory requirements for the first and second compression algorithms.

Referring again to FIG. 3A, storage and processing requirements may be determined for different combinations of compression algorithms and data partition values (blocks 330 and 332). In certain embodiments, the method may consider all combinations of two different compression algorithms from the set of available algorithms. In some embodiments, the method may consider some but not all combinations of two different compression algorithms.

In certain embodiments, the output of the method may be the combination of compression algorithms and a corresponding data partition value that results in minimum processing requirements and/or storage requirements. In particular embodiments, the output of the method may be the combination of compression algorithms and a corresponding data partition value that minimizes cost, based on the required number of storage devices, the required number of processors, and the unit cost of storage devices and processors.

Figure 4:
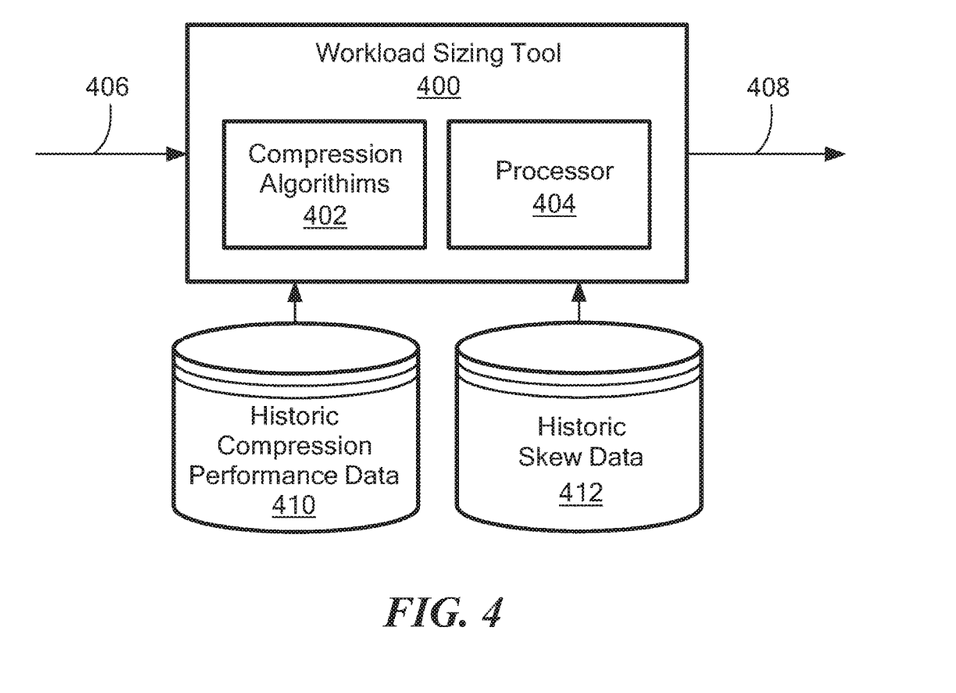
FIG. 4 is a block diagram of a tool for sizing a storage array to a workload, according to an embodiment of the disclosure.

FIG. 4 shows an embodiment of a tool 400 that can size a storage array for a workload, wherein the storage array supports multiple compression algorithms. The tool 400 includes a set of available compression algorithms 402 and a processor 404. The tool 400 further includes an input 406 and an output 408. In some embodiments, the input may receive information about a workload and the output provides resource requirements (e.g., storage, memory, and processing requirements) needed to handle the workload.

In some embodiments, the tool may be used to size a storage array without having full details of their workload. In various embodiments, a customer may have compression performance data and/or skew data for some but not all logical data sets in a workload. In such embodiments, the tool may use historic information about similar workloads as a substitute for the missing data in order to provide a sizing estimate for the workload. In the embodiment of FIG. 4, the tool 400 has access to a database of historic compression performance data 410 and a database of historic skew data 412. In other embodiments, the tool may have access to other types of historical data that can be used for sizing. In various embodiments, the historical data may be collected from previously sized workloads where that data was available. In some embodiments, the historical data may be collected and used on a per-customer basis. In other embodiments, historical data may be shared between customers. In various embodiments, the historic compression performance data and/or skew data may be organized by application type. In such embodiments, historic compression performance data may indicate a low compression ratio for online transaction processing (OLTP) applications and a relatively high compression ratio for data warehouse applications.

In some embodiments, when sizing a workload, an application type may be specified for one or more of its logical data sets (e.g., as part of input 406). In such embodiments, the tool may use the application type to retrieve historic compression performance data and/or skew data for applications of the same type.

In many embodiments, the tool may use at least some of the processing described below in conjunction with FIGS. 5 and 3A to generate resource requirements for a workload.

Referring to FIG. 5, a method 500 can be used to size a storage array having multiple compression algorithms, according to an embodiment. In one embodiment, a workload sizing tool (e.g., workload sizing tool 400 of FIG. 4) implements at least a portion of the method 500.

Referring to the embodiment of FIG. 5, at block 502, an application type is determined for each logical data set within a workload. In some embodiments, each logical data set may have an expected data set size and an expected IOPS value. In one embodiment, possible application types may include OLTP applications and data warehouse applications.

Referring again to FIG. 5, at block 504, historic compression performance data and historic skew data is retrieved for each logical data. In some embodiments, the historic compression performance data and/or historic skew data may be retrieved using the corresponding application type. In some embodiments, historical data is retrieved from one or more databases wherein the data is grouped by application type.

Referring again to FIG. 5, at block 506, resource requirements are determined for each logical data set. In some embodiments, the resource requirements may be determined using corresponding skew data, compression performance data, expected data set size, and expected IOPS value. In many embodiments, the resource requirements may be resources needed to store the logical data set and to process I/Os for the logical data set (i.e., the resources needed to "handle" the logical data set), where some (or all) of the data can be compressed. In some embodiments, the resource requirements may be the least expensive resources needed to handle the logical data set. In some embodiments, resource requirements for a logical data set may include an expected number of processor cycles needed to process I/Os for the logical data set (including any added processor cycles due to compression), an expected storage capacity needed to store the logical data set, and/or an expected memory capacity needed (including any added memory due to compression). In various embodiments, determining resource requirements for a logical data set may include performing at least some of the processing described below in conjunction with FIG. 3A.

Referring again to FIG. 5, at block 508, a set of resources that can handle the workload are determined. In many embodiments, the set of resources may be determined based on the resource requirements determined for each of the logical data sets. In some embodiments, the set of resources may be the least expensive set of resources needed to handle the workload. In certain embodiments, the set of resources may include a number of storage devices, a number of processors (e.g., CPUs), and/or an amount of memory (e.g., RAM). In one embodiment, the set of resources may include the minimal number of disks, number of processors, and/or amount of memory needed to handle the workload.

Figure 6:
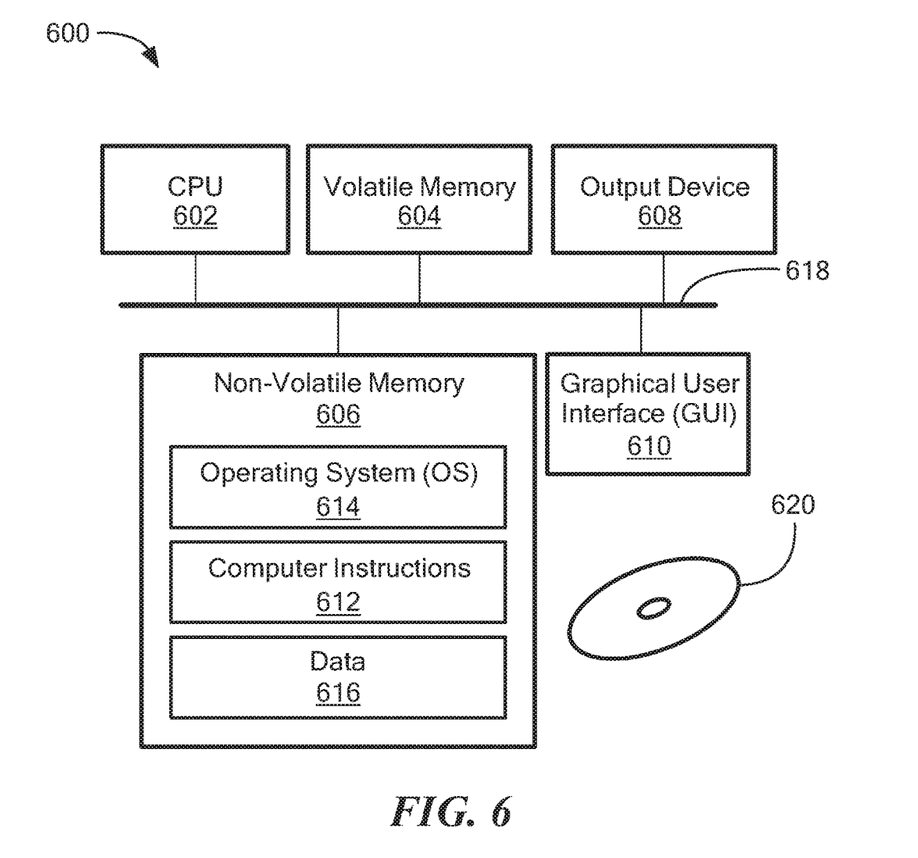
FIG. 6 is block diagram of a computer on which the processing of FIGS. 3, 3A, and 5 may be implemented, according to some embodiments of the disclosure.

FIG. 6 shows an illustrative computer 600 that can perform at least part of the processing described herein, according to an embodiment of the disclosure. The computer 600 may include a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 may be configured to store computer instructions 612, an operating system 614, and data 616. In one example, the computer instructions 612 are executed by the processor 602 out of volatile memory 604. In one embodiment, an article 620 comprises non-transitory computer-readable instructions. In some embodiments, the computer 600 corresponds to a virtual machine (VM). In other embodiments, the computer 600 corresponds to a physical computer.

Referring again to FIG. 6, processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
   determining compression performance data, an expected I/O operations per second (IOPS) value, an expected data set size, and skew data for a logical data set that is part of a workload of a storage array;
   determining resource requirements for the logical data set using the skew data, compression performance data, expected data set size, and expected IOPS value, the determining including selecting a first compression algorithm, a second compression algorithm, and a data partition value X that specifies a percentage of the first logical data set that would be compressed using the first compression algorithm, wherein 0<X<100; and
   storing the logical data set in the storage array based on the data partition value X, the first compression algorithm, and the second compression algorithm, the storing including compressing the logical data set by using the first compression algorithm and the second compression algorithm based on the data partition value X, such that X % of the logical data set is compressed using the first compression algorithm and at least some of a remaining portion of the logical data set is compressed by using the second compression algorithm.

2. The method of claim 1, further comprising:
   collecting I/O statistics for the logical data set,
   wherein the expected I/O operations per second (IOPS) value, the expected data set size, and the skew data for the logical data set are determined using the I/O statistics.

3. The method of claim 1, further comprising:
   determining an application type associated with the logical data set,
   wherein determining the compression performance data and skew data for the logical data set comprises retrieving historical compression performance data and skew data for the logical data set.

4. The method of claim 1, further comprising determining, based at least in part on the resource requirements for the logical data set, a set of resources in the storage array that can handle the workload, wherein determining the set of resources includes determining a number of processors, a number of storage devices, and an amount of memory that can handle the workload.

5. The method of claim 1, wherein determining resource requirements for the logical data set comprises:
   determining storage requirements for the logical data set using the compression performance data and expected data set size, where the storage requirements are based on compressing X % of the logical data set by using the first compression algorithm and the remaining portion of the logical data set using the second compression algorithm; and
   determining processing requirements for the logical data set using the compression performance data, expected IOPS value, and skew data, wherein the processing requirements are based on compressing a most active X % of the logical data set by using the first compression algorithm and compressing the remaining portion of the logical data set using the second compression algorithm.

6. The method of claim 5, wherein the first compression algorithm, the second compression algorithm, and the data partition value X, are selected based on the storage requirements and the processing requirements.

7. A system comprising:
   a memory; and
   at least one processor coupled to the memory, the at least one processor being configured to:
   determine compression performance data, an expected I/O operations per second (IOPS) value, an expected data set size, and skew data for a logical data set within a workload of a storage array;
determine resource requirements for the logical data set using the skew data, compression performance data, expected data set size, and expected IOPS value, the determining including selecting a first compression algorithm, a second compression algorithm, and a data partition value X that specifies a percentage of the first logical data set that would be compressed using the first compression algorithm, wherein 0<X<100; and
store the logical date set in the storage array based on the data partition value X, the first compression algorithm, and the second compression algorithm, the storing including compressing the logical data set by using the first compression algorithm and the second compression algorithm based on the data partition value X, such that X % of the logical data set is compressed using the first compression algorithm and at least some of a remaining portion of the logical data set is compressed by using the second compression algorithm.

8. The system of claim 7, wherein the at least one processor is further configured to collect I/O statistics for the logical data set, the expected I/O operations per second (IOPS) value, the expected data set size, and skew data for the logical data set are determined using the I/O statistics.

9. The system of claim 7, wherein the at least one processor is further configured to wherein determine an application type associated with the logical data set, wherein determining the compression performance data and skew data for the logical data set comprises retrieving historical compression performance data and skew data for the logical data set.

10. The system of claim 7, wherein the at least one processor is further configured to determine, based at least in part on the resource requirements for the logical data set, a set of resources in the storage array that can handle the workload, wherein determining the set of resources that can handle the workload includes determining a number of processors, a number of storage devices, and an amount of memory that can handle the workload.

11. The system of claim 7 wherein determining resource requirements for the logical data set comprises:
determining storage requirements for the logical data set using the compression performance data and expected data set size, where the storage requirements are based on compressing X % of the logical data set by using the first compression algorithm and the remaining portion of the logical data set using the second compression algorithm; and
determining processing requirements for the logical data set using the compression performance data, expected IOPS value, and skew data, wherein the processing requirements are based on compressing a most active X % of the logical data set by using the first compression algorithm and compressing the remaining portion of the logical data set using the second compression algorithm.

12. The system of claim 11, wherein the first compression algorithm, the second compression algorithm, and the data partition value X, are selected based on the storage requirements and the processing requirements.

13. A computer program product tangibly embodied in a non-transitory computer-readable medium, the non-transitory computer-readable medium storing one or more processor-executable instructions, which when executed by at least one processor cause the at least one processor to:

determine compression performance data, an expected I/O operations per second (IOPS) value, an expected data set size, and skew data a logical data set within a workload of a storage array;
determine resource requirements for the logical data set using the skew data, compression performance data, expected data set size, and expected IOPS value, the determining including selecting a first compression algorithm, a second compression algorithm, and a data partition value X that specifies a percentage of the first logical data set that would be compressed using the first compression algorithm, wherein 0<X<100; and
store the logical data set in the storage array based on the data partition value X, the first compression algorithm, and the second compression algorithm, the storing including compressing the logical data set by using the first compression algorithm and the second compression algorithm based on the data partition value X, such that X % of the logical data set is compressed using the first compression algorithm and at least some of a remaining portion of the logical data set is compressed by using the second compression algorithm.

14. The computer program product of claim 13, wherein:
the processor-executable instructions, when executed by the at least one processor, further cause the at least one to collect I/O statistics for the logical data set, and
the expected I/O operations per second (IOPS) value, the expected data set size, and the skew data for the logical data set are determined using the I/O statistics.

15. The computer program product of claim 13, wherein:
the processor-executable instructions, when executed by the at least one processor, further cause the at least one processor to determine an application type associated with the logical data set, and
determining the compression performance data and skew data for the logical data set comprises retrieving historical compression performance data and skew data for the logical data set.

16. The computer program product of claim 13, wherein:
the processor-executable instructions, when executed by the at least one processor, further cause the at least one processor to determine, based at least in part on the resource requirements for the logical data set, a set of resources in the storage array that can handle the workload, and
determining the set of resources that can handle the workload includes determining a number of processors, a number of storage devices, and an amount of memory that can handle the workload.

17. The computer program product of claim 13, wherein determining resource requirements for the logical data set comprises:
determining storage requirements for the logical data set using the compression performance data and expected data set size, where the storage requirements are based on compressing X % of the logical data set by using the first compression algorithm and the remaining portion of the logical data set using the second compression algorithm; and
determining processing requirements for the logical data set using the compression performance data, expected IOPS value, and skew data, wherein the processing requirements are based compressing a most active X % of the logical data set by using the first compression algorithm and compressing the remaining portion of the logical data set using the second compression algorithm.

18. The computer program product of claim 17, wherein the first compression algorithm, the second compression algorithm, and the data partition value X, are selected based on the storage requirements and the processing requirements.

* * * * *